US012682705B2

(12) United States Patent
Smyth

(10) Patent No.: US 12,682,705 B2
(45) Date of Patent: Jul. 14, 2026

(54) SYSTEMS AND METHODS FOR USING MOBILE WALLETS AS USER IDENTIFIERS

(71) Applicant: JPMORGAN CHASE BANK, N.A., New York, NY (US)

(72) Inventor: Brian James Smyth, West Chester, PA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 40 days.

(21) Appl. No.: 18/941,498

(22) Filed: Nov. 8, 2024

(65) Prior Publication Data

US 2025/0182545 A1 Jun. 5, 2025

Related U.S. Application Data

(60) Provisional application No. 63/605,409, filed on Dec. 1, 2023.

(51) Int. Cl.
*G07C 9/00* (2020.01)

(52) U.S. Cl.
CPC ................................ *G07C 9/00309* (2013.01)

(58) Field of Classification Search
None
See application file for complete search history.

(56) References Cited

U.S. PATENT DOCUMENTS

2012/0030121 A1* 2/2012 Grellier .............. G06Q 20/3278 705/67
2016/0353519 A1* 12/2016 Kogen .................. H04W 88/02
2017/0161728 A1* 6/2017 Satyanarayan ...... G06Q 20/363
2018/0341948 A1* 11/2018 Kumnick ........... G06Q 20/4016

* cited by examiner

*Primary Examiner* — Carlos Garcia
(74) *Attorney, Agent, or Firm* — GREENBERG TRAURIG LLP

(57) ABSTRACT

A method may include: storing, by a user device, a token for a financial instrument, wherein an issuing financial institution stores an association between the financial instrument and a partner loyalty identifier or a ticket identifier; communicating, by the user device and as part of an access request, the token to a sensor, wherein the sensor is associated with an access restrictor for an area; communicating the token to the issuing financial institution with a request for information; detokenizing, by the issuing financial institution, the token and retrieving the associated partner loyalty identifier or ticket identifier; receiving, by a facility backend, the associated partner loyalty identifier or ticket identifier and decisioning the access request using the associated partner loyalty identifier or ticket identifier; and controlling, by the facility backend, the access restrictor to grant access in response to the access request being approved.

20 Claims, 3 Drawing Sheets

SYSTEMS AND METHODS FOR USING MOBILE WALLETS AS USER IDENTIFIERS

RELATED APPLICATIONS

This application claims priority to, and the benefit of, U.S. Provisional Patent Application Ser. No. 63/605,409, filed Dec. 1, 2024, the disclosure of which is hereby incorporated, by reference, in its entirety.

BACKGROUND OF THE INVENTION

1. Field of the Invention

Embodiments are generally directed to systems and methods for using mobile wallets as user identifiers.

2. Description of the Related Art

It is very convenient for individuals to have credit cards, debit cards, licenses, tickets, and other credentials stored in a mobile wallet on their mobile devices. Instead of having to pull out and present a credit card for payment, the user may position the mobile device near a reader and have information transmitted wirelessly, or may have the mobile device generate a code, such as a QR code, that may be read by a camera.

SUMMARY OF THE INVENTION

Systems and methods for using mobile wallets as user identifiers are disclosed. In one embodiment, a method may include: (1) storing, by a user device, a token for a financial instrument, wherein an issuing financial institution computer program for the financial instrument stores an association between the financial instrument and a partner loyalty identifier or a ticket identifier; (2) communicating, by the user device and as part of an access request, the token to a sensor, wherein the sensor is associated with an access restrictor for an area; (3) communicating, by the sensor, the token to a facility backend associated with the area; (4) communicating, by the facility backend, the token to the issuing financial institution computer program with a request for information; (5) detokenizing, by the issuing financial institution computer program, the token and retrieving the associated partner loyalty identifier or ticket identifier; (6) receiving, by the facility backend, the associated partner loyalty identifier or ticket identifier; (7) decisioning, by the facility backend, the access request using the associated partner loyalty identifier or ticket identifier; and (8) controlling, by the facility backend, the access restrictor to grant access in response to the access request being approved.

In one embodiment, the user device comprises a mobile electronic device executing a mobile wallet computer program, and the token is provisioned by the issuing financial institution computer program to the mobile wallet computer program.

In one embodiment, the user device comprises a wirelessly-enabled physical card, and the token is stored in a chip provided on the wirelessly-enabled physical card.

In one embodiment, the access restrictor comprises a door, a gate, or a turnstile.

In one embodiment, the token is communicated by RF communication or by optical communication.

In one embodiment, the request for information comprises a request for the partner loyalty identifier or the ticket identifier.

In one embodiment, the step of controlling the access restrictor to grant access in response to the access request being approved comprises unlocking, by the facility backend, a lock associated with the access restrictor.

According to another embodiment, a system may include: a user device storing a token for a financial instrument issued by an issuing financial institution; an issuing financial institution electronic device executing an issuing financial institution computer program, wherein the issuing financial institution computer program stores an association between the financial instrument and a partner loyalty identifier or a ticket identifier; an access restrictor for an area comprising a sensor; and a facility backend associated with the area. The user device is configured to communicate, as part of an access request, the token to the sensor; the sensor is configured to communicate the token to the facility backend; the facility backend is configured to communicate the token to the issuing financial institution computer program with a request for information; the issuing financial institution computer program is configured to detokenize the token and to retrieve the associated partner loyalty identifier or ticket identifier; the facility backend is configured to receive the associated partner loyalty identifier or ticket identifier; the facility backend is configured to decision the access request using the associated partner loyalty identifier or ticket identifier; and the facility backend is configured to control the access restrictor to grant access in response to the access request being approved.

In one embodiment, the user device comprises a mobile electronic device executing a mobile wallet computer program, and the token is provisioned by the issuing financial institution computer program to the mobile wallet computer program.

In one embodiment, the user device comprises a wirelessly-enabled physical card, and the token is stored in a chip provided on the physical card.

In one embodiment, the access restrictor comprises a door, a gate, or a turnstile.

In one embodiment, the token is communicated by RF communication or by optical communication.

In one embodiment, the request for information comprises a request for the partner loyalty identifier or the ticket identifier.

In one embodiment, the facility backend is configured to control the access restrictor to grant access in response to the access request being by unlocking a lock associated with the access restrictor.

According to another embodiment, a non-transitory computer readable storage medium may include instructions stored thereon, which when read and executed by one or more computer processors, cause the one or more computer processors to perform steps comprising: receiving, from a user device, a user device, a token for a financial instrument, wherein an issuing financial institution computer program for the financial instrument stores an association between the financial instrument and a partner loyalty identifier or a ticket identifier; communicating the token to the issuing financial institution computer program with a request for information; receiving, from the issuing financial institution computer program, the associated partner loyalty identifier or ticket identifier; decisioning the access request using the associated partner loyalty identifier or ticket identifier; and controlling an access restrictor to grant access in response to the access request being approved.

In one embodiment, user device comprises a mobile electronic device executing a mobile wallet computer program, and the token is provisioned by the issuing financial institution computer program to the mobile wallet computer program.

In one embodiment, the user device comprises a wirelessly-enabled physical card, and the token is stored in a chip provided on the physical card.

In one embodiment, the access restrictor comprises a door, a gate, or a turnstile.

In one embodiment, the token is communicated by RF communication or by optical communication.

In one embodiment, the instructions stored thereon for controlling the access restrictor to grant access in response to the access request being approved further comprise instructions, which when read and executed by the one or more computer processors, cause the one or more computer processors to unlock a lock associated with the access restrictor.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
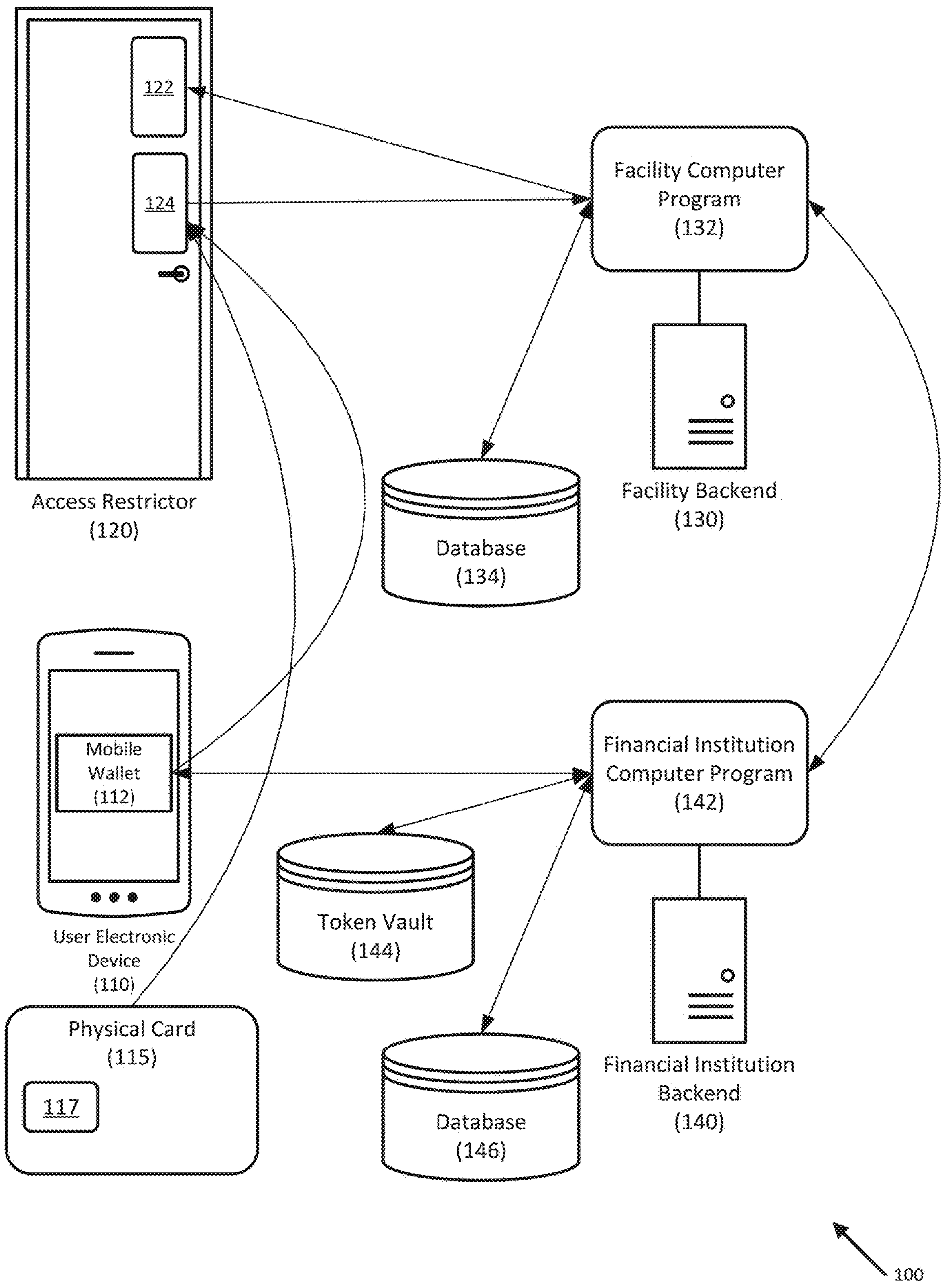
FIG. 1 illustrates a system for using mobile wallets as user identifiers according to an embodiment.

Systems and methods for using mobile wallets as a user identifiers are disclosed.

Embodiments may provide a safe, secure and convenient method for user identification for partner users within their properties. Examples may include keyless door entry for hotels, user identification for travel kiosks to check bags, boarding passes, etc., user identification for entertainment parks for tickets, "fast passes", etc.

For example, with a hotel partner, a user may check-in to a hotel room and may select keyless access to the room. The user may check in using the partner application, or in person. The user would be returned a room number.

To enter the room, the user may tap a mobile device that has a financial institution associated with the hotel (e.g., a co-branded card) provisioned to a key sensor near the door. The mobile wallet may communicate a token for the provisioned financial instrument to the key sensor, which would then initiate a call to the issuing financial institution. The issuing financial institution may de-tokenize the card number and return a partner loyalty identifier for the user. The hotel backend would then confirm that the user's loyalty identifier matches with the loyalty identifier associated with the room, and would then instruct the door lock associated with the sensor to unlock the door.

In one embodiment, a non-cobranded card may be used. An association between the financial instrument and the card number may be registered with the issuing financial institution.

In another embodiment, instead of returning the partner loyalty identifier, the issuing financial institution may return the card number for the financial instrument. The card number may be encrypted or otherwise secured. If the card number returned from the issuing financial institution matches the card number presented by the user during check-in, the hotel backend may instruct the door lock associated with the sensor to unlock the door.

Embodiments may be used with other systems that may require user identification, such as airline kiosks for check-ins, to sign-up for a feature such as a "fastpass" or similar at an amusement park, to access certain areas within a facility, such as a concierge floor, a VIP area, etc.

In one embodiment, instead of presenting a ticket to a concert, sporting event, or similar, the user may present the card that was used to purchase the ticket. The facility backend may call the issuing financial institution with the token, and may receive a ticket number from the issuing financial institution. If the ticket number is valid, the user may be allowed to enter the event.

The user may manually enroll an association between the ticket number and the issuing financial institution, or the ticket provider may provide the ticket number to the issuing financial institution which may perform the association.

In one embodiment, once the token is used for a partner, it may be stored or cached for use as a direct identifier, or may be sent to a merchant so the merchant has the token in advance.

Referring to FIG. 1, a system for using mobile wallets as user identifiers is disclosed according to an embodiment. System 100 may include user electronic device 110, such as a tablet computer, a smart phone, a smart watch, or similar that may execute mobile wallet 112. Examples of mobile wallets 112 include the Apple Wallet, Google Wallet, etc.

Mobile wallet 112 may store one or more provisioned financial instruments that are provisioned by financial institution computer program 142.

In another embodiment, system 100 may include physical card 115 that includes chip 117. Physical card 115 may be enabled to communicate data from chip 117 wirelessly, such as by Near Field Communication (NFC) or similar.

Physical card 115 may have a credit card form, or it may be a fob or similar.

Financial institution backend 140 may be a computer system for an issuing financial institution, and may execute financial institution computer program 142. Financial institution computer program 142 may provision tokens to mobile wallet 112; in another embodiment, a third party (e.g., a card association, payment network, etc.) may generate the tokens. The issuing financial institution may maintain an association between the tokens and the primary account number (PAN) in token vault 144.

Financial institution computer program 142 may maintain an association between a partner loyalty identifier for a user with a partner and a financial instrument in database 146. In one embodiment, the financial instrument may be a co-brand card, or it may be a standard, non-cobranded card.

In one embodiment, the association may be created upon financial instrument issuance; in another embodiment, the association may be performed manually by the user.

In one embodiment, the association may also be between an identifier that is not a loyalty identifier, such as a ticket number.

Mobile wallet 112 may communicate a token for the financial instrument to sensor 122 that may be provided at a facility. Sensor 122 may be associated with, for example, access restrictor 20, such as a door, a gate (e.g., a turnstile, an airline boarding door, etc.), or some other access restriction. In another embodiment, sensor 122 may be provided at a kiosk and may be used to retrieve information (e.g., check-in documents).

In another embodiment, physical card 115 may communicate the token from chip 117 to sensor 122.

Sensor 122 may communicate the token to facility computer program 132, which may communicate the token to facility computer program 132 that may be executed by facility backend 130. Financial institution computer program 142 may receive the token, detokenize the PAN, and may return the information associated with the PAN, such as the partner loyalty number, a ticket number, etc. to facility computer program 132 In another embodiment, financial institution computer program 142 may return the PAN to facility computer program 132.

Facility computer program 132 may then use the information received from financial institution computer program 142 to decision the request from sensor 122. For example, if the partner loyalty identifier received from financial institution computer program 142 matches the partner loyalty identifier with the registered guest in the room (e.g., by checking database 134), facility computer program 132 may cause actuator 124 (e.g., a door lock, a turnstile, a gate, etc.) to activate, thereby causing access restrictor 120 to provide access to the area, facility, or to provide certain information (e.g., boarding pass credentials, etc.) to the user.

Figure 2:
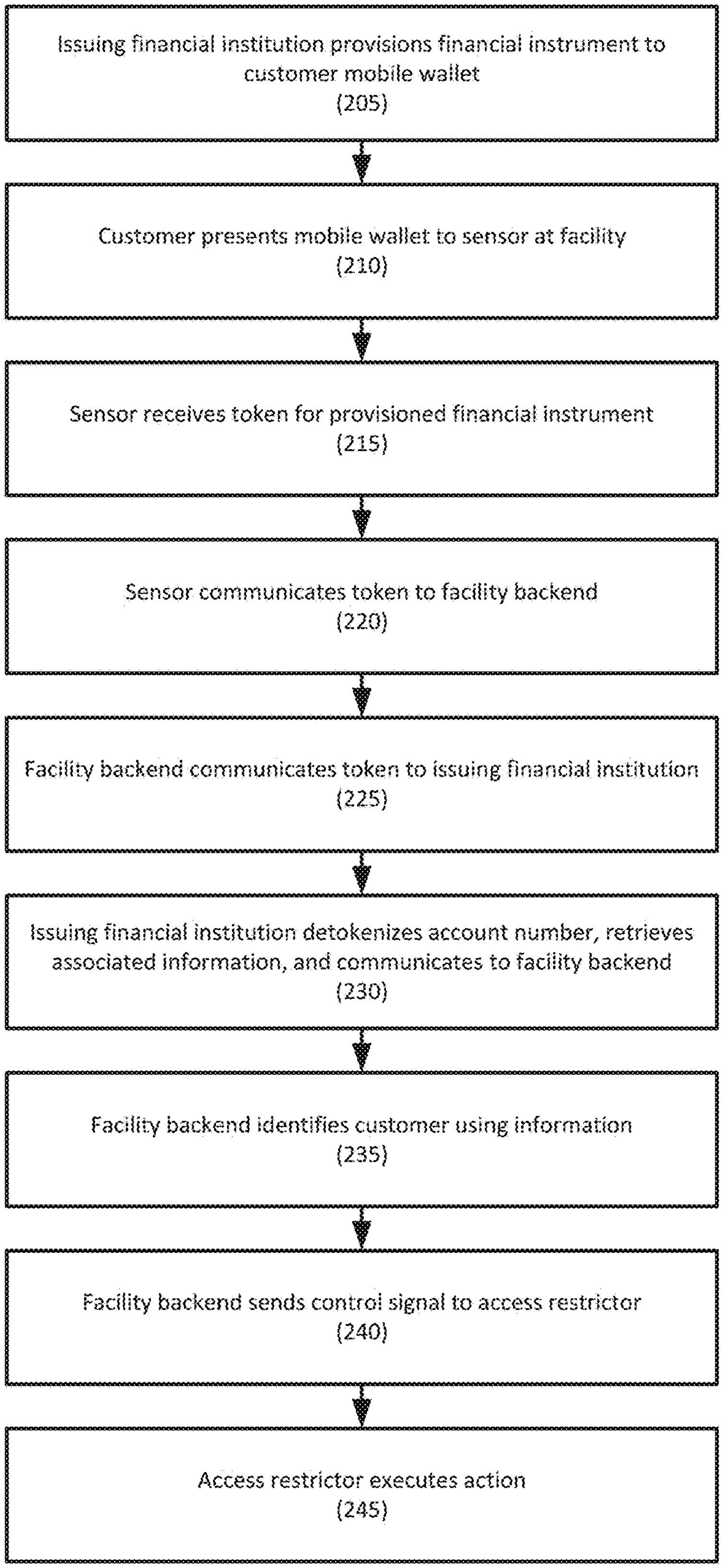
FIG. 2 illustrates a method for using mobile wallets as user identifiers according to an embodiment.

Referring to FIG. 2, a method for using mobile wallets as user identifiers is disclosed according to an embodiment.

In step 205, an issuing financial institution may provision a financial instrument to a customer mobile wallet. In one embodiment, the financial instruments may be associated with a partner loyalty identifier.

In one embodiment, once provisioned, the customer may optionally associate certain information with the financial instrument, such as the partner loyalty identifier, a ticket number, etc. In one embodiment, the customer may do this manually; in another embodiment, the association may be automatic (e.g., the issuing financial institution may receive a ticket number when a ticket is purchased).

In another embodiment, a physical card may store the token for the financial instrument.

In step 210, the customer may present the mobile wallet or the physical card to a sensor at a facility. The sensor may be associated with an access restrictor for an area, such as a door, a gate, a turnstile, etc.

In step 215, the sensor may receive a token for the provisioned financial instrument from the mobile wallet or physical card. The token may be received by RF communication (e.g., NFC, Bluetooth, etc.), optically (e.g., by scanning a QR code generated by the mobile wallet), etc.

In step 220, the sensor may communicate the token to a facility backend and, in step 225, the facility backend may communicate the token to the issuing financial institution. In one embodiment, the facility backend may request certain information associated with the token, such as the loyalty identifier, a ticket number, the PAN, etc.

In step 230, the issuing financial institution may detokenize the account number and may retrieve the associated information. It may communicate the information back to the facility backend.

In step 235, the facility backend may identify the customer using the information and may decision the request. For example, if the loyalty identifier received from financial institution computer program matches the loyalty identifier associated with the registered guest in the room, in step 240, the facility computer program may control the access restrictor to allow access to the area, facility, etc.

For example, the facility backend may send a control signal to the access restrictor to unlock a lock so that the customer may pass through the gate, door, turnstile, etc.

In step 245, the actuator may execute the instructed action.

In another embodiment, the facility computer program may provide certain information (e.g., boarding pass credentials, etc.) to the customer.

Figure 3:
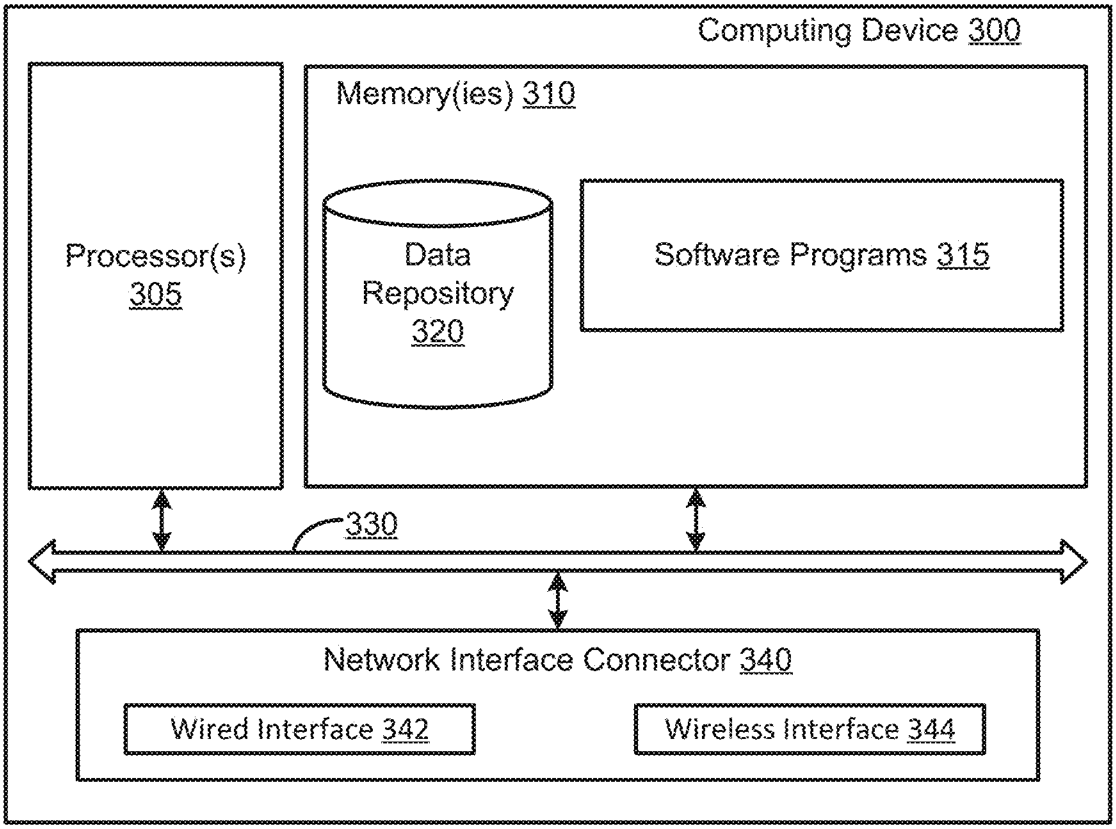
FIG. 3 depicts an exemplary computing system for implementing aspects of the present disclosure.

FIG. 3 depicts an exemplary computing system for implementing aspects of the present disclosure. FIG. 3 depicts exemplary computing device 300. Computing device 300 may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity, i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method, comprising:
- storing, by a user device, a token for a financial instrument, wherein an issuing financial institution computer program for the financial instrument stores an association between the financial instrument and a partner loyalty identifier or a ticket identifier;
- communicating, by the user device and as part of an access request, the token to a sensor, wherein the sensor is associated with an access restrictor for an area;
- communicating, by the sensor, the token to a facility backend associated with the area;
- communicating, by the facility backend, the token to the issuing financial institution computer program with a request for information;
- detokenizing, by the issuing financial institution computer program, the token and retrieving the associated partner loyalty identifier or ticket identifier;
- receiving, by the facility backend, the associated partner loyalty identifier or ticket identifier;
- decisioning, by the facility backend, the access request using the associated partner loyalty identifier or ticket identifier; and
- controlling, by the facility backend, the access restrictor to grant access in response to the access request being approved.

2. The method of claim 1, wherein the user device comprises a mobile electronic device executing a mobile wallet computer program, and the token is provisioned by the issuing financial institution computer program to the mobile wallet computer program.

3. The method of claim 1, wherein the user device comprises a wirelessly-enabled physical card, and the token is stored in a chip provided on the wirelessly-enabled physical card.

4. The method of claim 1, wherein the access restrictor comprises a door, a gate, or a turnstile.

5. The method of claim 1, wherein the token is communicated by RF communication or by optical communication.

6. The method of claim 1, wherein the request for information comprises a request for the partner loyalty identifier or the ticket identifier.

7. The method of claim 1, wherein the step of controlling the access restrictor to grant access in response to the access request being approved comprises unlocking, by the facility backend, a lock associated with the access restrictor.

8. A system, comprising:
- a user device storing a token for a financial instrument issued by an issuing financial institution;
- an issuing financial institution electronic device executing an issuing financial institution computer program, wherein the issuing financial institution computer program stores an association between the financial instrument and a partner loyalty identifier or a ticket identifier;
- an access restrictor for an area comprising a sensor; and
- a facility backend associated with the area;
- wherein:
  - the user device is configured to communicate, as part of an access request, the token to the sensor;
  - the sensor is configured to communicate the token to the facility backend;
  - the facility backend is configured to communicate the token to the issuing financial institution computer program with a request for information;
  - the issuing financial institution computer program is configured to detokenize the token and to retrieve the associated partner loyalty identifier or ticket identifier;
  - the facility backend is configured to receive the associated partner loyalty identifier or ticket identifier;
  - the facility backend is configured to decision the access request using the associated partner loyalty identifier or ticket identifier; and
  - the facility backend is configured to control the access restrictor to grant access in response to the access request being approved.

9. The system of claim 8, wherein the user device comprises a mobile electronic device executing a mobile wallet computer program, and the token is provisioned by the issuing financial institution computer program to the mobile wallet computer program.

10. The system of claim 8, wherein the user device comprises a wirelessly-enabled physical card, and the token is stored in a chip provided on the physical card.

11. The system of claim 8, wherein the access restrictor comprises a door, a gate, or a turnstile.

12. The system of claim 8, wherein the token is communicated by RF communication or by optical communication.

13. The system of claim 8, wherein the request for information comprises a request for the partner loyalty identifier or the ticket identifier.

14. The system of claim 8, wherein the facility backend controls the access restrictor to grant access in response to the access request being approved by unlocking a lock associated with the access restrictor.

15. A non-transitory computer readable storage medium, including instructions stored thereon, which when read and executed by one or more computer processors, cause the one or more computer processors to perform steps comprising:
- receiving, from a user device, a user device, a token for a financial instrument, wherein an issuing financial institution computer program for the financial instrument stores an association between the financial instrument and a partner loyalty identifier or a ticket identifier;

communicating the token to the issuing financial institution computer program with a request for information;

receiving, from the issuing financial institution computer program, the associated partner loyalty identifier or ticket identifier;

decisioning the request using the associated partner loyalty identifier or ticket identifier; and controlling an access restrictor to grant access in response to the access request being approved.

16. The non-transitory computer readable storage medium of claim 15, wherein the user device comprises a mobile electronic device executing a mobile wallet computer program, and the token is provisioned by the issuing financial institution computer program to the mobile wallet computer program.

17. The non-transitory computer readable storage medium of claim 15, wherein the user device comprises a wirelessly-enabled physical card, and the token is stored in a chip provided on the physical card.

18. The non-transitory computer readable storage medium of claim 15, wherein the access restrictor comprises a door, a gate, or a turnstile.

19. The non-transitory computer readable storage medium of claim 15, wherein the token is communicated by RF communication or by optical communication.

20. The non-transitory computer readable storage medium of claim 15, wherein the instructions stored thereon for controlling the access restrictor to grant access in response to the access request being approved, further comprise instructions, which when read and executed by the one or more computer processors, cause the one or more computer processors to unlock a lock associated with the access restrictor.

* * * * *